Patented Sept. 2, 1952

2,609,357

UNITED STATES PATENT OFFICE 2,609,357

PREPARATION OF THERMOSET RESINS

Joseph E. Koroly, Philadelphia, Pa., assignor to Rohm & Haas Company, Philadelphia, Pa., a corporation of Delaware No Drawing. Application November 13, 1950, Serial No. 195,459

19 Claims. (Cl. 260—75)

1

This invention relates to the preparation of new thermoset resins. It relates to a method of making such resins and to the resins per se which are new compositions of matter having particular advantages when employed as castings, adhesives, surface-coatings, foamed materials and as potting compounds for electrical assemblies.

These resins are made by chemically reacting, under the influence of heat, a polycarboxylic acid, which contains more than two carboxyl groups, with a particular kind of epoxy ether; namely, one having the general formula:

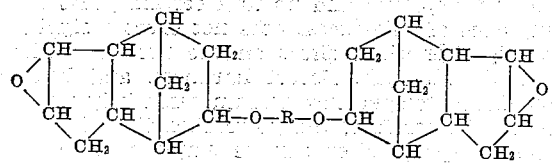

in which R is the alkylene radical of a glycol, HO—R—OH, such as ethylene glycol, or the radical of a polyalkylene glycol,

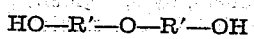

such as diethylene glycol. One big advantage of preparing cast resins by this process is that no significant amounts of gaseous by-products such as water, ammonia, hydrochloric acid or the like are formed by the reaction and as a result the products are hard, tough, and bubble-free. Furthermore, the preparation of the resin is not inhibited by air and very little shrinkage in volume (about 1%) occurs during this reaction in contrast with the formation of other resins such as polystyrene or the esters of polymethacrylic acids. The products of this invention are thermoset; i. e., are highly cross-linked, and as such are characterized by stability, durability, and resistance to heat and solvents. In general, they resemble polystyrene in appearance but differ fundamentally from the latter by virtue of being thermoset.

The epoxy ethers which react by the process of this invention are those which have been described by W. D. Niederhauser in his Letters Patent No. 2,543,419 which issued February 27, 1951, entitled "Polycyclic Di-Epoxy Ethers." These ethers are actually di-epoxides of glycol bis-exodihydrodicyclopentadienyl ethers having the general formula given above in which R is a member of the class consisting of (a) alkylene groups containing 1 to 12 carbon atoms and (b) groups of the general formula (R'—O)$_x$R' in which R' is an alkylene group of 2 to 4 carbon atoms and $x$ is an integer having a value of 1 to 8 inclusive. In the process of this invention reaction takes

2 place at the two terminal epoxy groups and the remainder of the molecule including the group represented by R remains intact. Therefore, the group represented by R can vary within the limits set forth above without adversely affecting the course of the reaction. Thus, the process of this invention is applicable to the reaction of polycarboxylic acids with the diepoxides of the ethers of dicyclopentadiene and glycols, which glycols are typified by the following: Ethylene glycol, diethylene glycol, the isomeric butylene glycols, hexamethylene glycol and its branched-chained isomers such as 1,2-dihydroxyhexane, octylene glycols such as 1,2-dihydroxyoctane or 1,8-dihydroxyoctane, triethylene glycol, tetrapropylene glycols, dibutylene glycols, hexabutylene glycols, and octaethylene glycols.

The polycarboxylic acids which react by the process of this invention are those which contain three or more carboxyl groups. Typical of such acids are citric, tricarballylic, hemimellitic, trimellitic, and pyromellitic acids. Of greater interest, however, than these acids are those half-ester-polycarboxylic acids made by reacting dicarboxylic acids or their anhydrides with polyhydric alcohols such as glycerol, pentaerythritol, dipentaerythritol, sorbitol, mannitol, and the like whereby the half-ester-half-acid is formed. These ester-acids are readily prepared by reacting one mole of the polyhydric alcohol with that number of moles of dibasic acid or anhydride which is equal to the number of hydroxyl groups in the alcohol. Thus, for example, in preparing such half-ester-acids from glycerol, one mole of glycerol is esterified with three moles of a dicarboxylic acid such as phthalic acid—or preferably with three moles of an acid anhydride such as phthalic anhydride. Similarly, in the case of pentaerythritol four moles of a dicarboxylic acid or its anhydride are reacted with one mole of the tetrahydric alcohol. Furthermore, mixed ester-acids have been reacted with the epoxy ethers to give resins of outstanding properties as, for instance, the ester-acid made by reacting one mole of pentaerythritol with three moles of phthalic anhydride and one mole of maleic anhydride. This particular ester-acid has the average formula

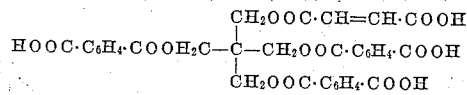

Half-ester-acids are operable which are made from any mixture of dibasic acids set forth herein so long as the total number of moles of the acids reacted with one mole of the polyhydric alcohol is equal to the number of hydroxyl groups in the alcohol.

The half-ester-acids made from such alcohols as glycerol or pentaerythritol and saturated, aliphatic, dicarboxylic acids having the general formula $$HOOC \cdot (CH_2)_x \cdot COOH$$

in which $x$ is an integer of value 2 to 8 also react with the bis-epoxy ethers in the same manner to give resins. These resins, however, differ in physical properties, as might be expected, from those resins made with the ester-acids from the same alcohol and maleic or phthalic anhydrides. Examples of such reactants include the half-ester-acids made from glycerol, pentaerythritol, dipentaerythritol, mannitol or sorbitol and succinic, glutaric, adipic, pimelic, suberic, azelaic, and sebacic acids. The above-described polycarboxylic acids all react by the process of this invention to form resinous products, but it also is to be understood that other carboxylic acids which contain three or more carboxyl groups, such as polymeric acids, as well as mixtures of polycarboxylic acids react in the same way and that the physical properties of the resultant products vary from resinous, cross-linked semi-fluid gums to hard, tough, infusible, durable masses depending upon the particular polycarboxylic acid and the kind and size of the group, represented by $R$, in the epoxy ether.

The reaction of the polycarboxylic acid and the epoxy-ether is carried out under the influence of heat and the chemical reaction occurs more rapidly as the temperature is raised. Temperatures from 50° C. to 250° C. have been employed successfully but those from about 100° C. to about 200° C. are much preferred. At the lowest temperatures the rate of reaction may be objectionably slow, especially when large quantities of reactants are involved. At the highest temperatures objectionable discoloration may take place. When the process of this invention is used to prepare castings, a very satisfactory procedure is to place the mixture of reactants in a mold and heat the mold at a convenient temperature until the reactants have combined to form a self-sustaining or rigid mass and then to remove this mass from the mold and continue the reaction or "cure" for example in an oven or under infra-red radiation.

During the preparation of the products of this invention it is believed that a carboxyl group reacts with an epoxy group to form a hydroxy ester in this way:

(1) 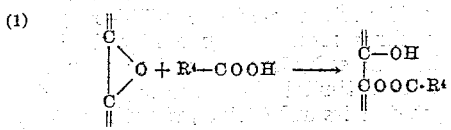

Thus, it is preferred that the polycarboxylic acids and the bis-epoxy ethers be reacted in such a ratio as to provide one carboxyl group for each epoxide group. Since the bis-epoxy ethers contain two epoxide groups, it is evident that one mole of the bis-epoxy ether will react according to the above equation with one-half mole of a tetracarboxylic acid or that three moles of bis-epoxy ether will react in a like manner with two moles of a tricarboxylic acid. While it is preferred to react the bis-epoxy ether and polycarboxylic acid in the above ratio, it is true, however, that additional quantities of acid can react to esterify the hydroxyl groups shown in the product of the equation above. This secondary reaction takes the following course:

(2) 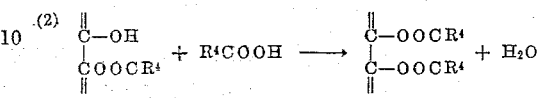

It is to be noted that, although water is liberated by the secondary reaction, the amount of water is in reality negligible because of the fact that both the bis-epoxy ethers and polycarboxylic acids are of unusually high molecular weight. In view of the secondary reaction, the amount of acid which can react is actually that amount which provides two carboxyl groups for each epoxy group in the bis-epoxy ether. As the amount of acid is raised from the preferred ratio required by Equation 1 to that required by Equation 2, the physical properties of the products change slightly. Thus, the products are harder but have somewhat lowered flexural strength, which is considered a measure of toughness, and lower heat-distortion temperatures. Alternatively, even a lower amount of acid can be employed than that required by Equation 1 above. This means that an excess of the bis-epoxy ether can be employed and up to a certain point the presence of this excess does not exert a significantly deleterious effect on the product. The flexural strength, Barcol hardness, and heat-distortion temperature remain essentially unaffected. Therefore, the polycarboxylic acid and the bis-epoxy ether can be employed in such amounts as to provide from about 0.7 to about 2.0 carboxyl groups in the acid for each epoxy group in the bis-epoxy ether.

Fillers, extenders, dyes, pigments, and the like can also be added to the mixture of reactants in order to modify the product. In a similar way, plasticizers such as high-boiling monomeric esters, typified by dibutyl phthalate and tricresyl phosphate, or epoxidized vegetable oils can be incorporated.

Catalysts have been added to the reaction mixtures of this invention in order to accelerate the formation of the resinous products. Boron trifluoride and its complexes with ethers, acids, and amines have been used as well as a large number of strong acids and partial esters of strong acids. In general, these catalysts shorten the induction period but have little real effect in reducing the over-all time of reaction, especially in bulk polymerization, and in many instances cause darkening, embrittling, or discoloration of the product. Butyl and cresyl diacid phosphates are the most satisfactory to date.

The following examples serve to illustrate how the products of this invention are prepared.

Example 1

One mole of the diepoxide of the bis-exo-dihydrodicyclopentadienyl ether of diethylene glycol, having the formula

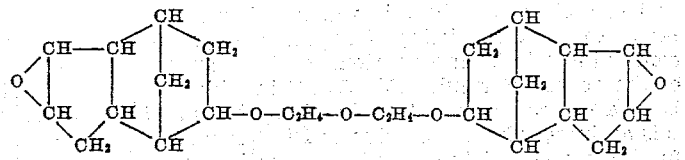

and one-half mole of pentaerythrityl tetra-acid trimaleate-monophthalate, having the formula

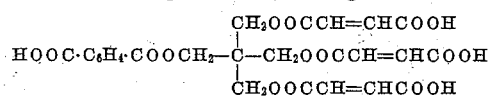

were mixed in a beaker and the stirred mixture was heated. This ratio provided one carboxyl group for each epoxy group in the bis-epoxy ether. The mixture began to fuse at 75° C. and was clear and homogeneous at 125° C. At this stage the reaction mixture could easily be poured and a sample, on cooling, changed into a solid but fusible mass. The thermoplastic mass was then heated to 150° C. where it was held for four hours. During this period of heating the mixture gradually increased in viscosity until at the end it had become a hard, tough, infusible, resinous mass. This change from the thermoplastic to the thermoset condition was rapid but not abrupt. Thus, after about one-half hour the mass was gummy at 150° C.; after an hour it was a firm solid, which, however, could be dented at 150° C. by a pencilpoint while after two hours it could not be so dented. Samples of the resinous product were taken at intervals and tested for hardness after being cooled to room temperature. The sample taken after one hour of heating at 150° C. had a Barcol hardness of 30–32. The sample taken after two hours of heating had a Barcol hardness of 36–38, while the final product had a hardness of 44.

The physical properties of this resin are evident from the resulting data:

Flexural strength_____ 19,500 lbs./sq. in.
Flexural modulus_____ 383,000 lbs./sq. in.
Compressive strength_____ 18,300 lbs./sq. in.
Tensile strength_____ 11,400 lbs./sq. in.
Elongation at break_____ 7%
Modulus of elasticity_____ 420,000 lbs./sq. in.
Impact strength (izod) ___ 1.3 ft.—lbs./in. of notch.
Linear coefficient of expansion_____ $6.0 \times 10^{-5}$ per °C.
Heat distortion temp_____ 127° C. (in flexure, 10 mil distortion, 264 lbs./sq. in., 2° C./min.)
Dielectric constant_____ 4.0 (60 cycles)
4.0 ($10^3$ cycles)
3.6 ($10^6$ cycles)
Power factor_____ 0.006 (60 cycles)
0.012 ($10^3$ cycles)
0.035 ($10^6$ cycles)

Example 2

In the same manner as described in Example 1 above a mixture of one mole of the diepoxide of the bis-exo-dihydrodicyclopentadienyl ether of propylene glycol, having the formula

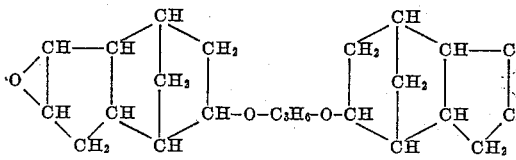

and one-half mole of the same acid as was used in Example 1; viz. pentaerythrityl tetra-acid trimaleate-monophthalate was heated to 150° C. and held there for four hours. Again the mixture fused at 75° C., was a clear, homogeneous liquid at 125° C., and passed from a liquid to a hard, tough, resinous, infusible mass when held at 150° C. for four hours. Cooled samples taken at various intervals had the following Barcol values for hardness: 35–37 after one hour; 42–44 after two hours; and 42–43 after four hours. This product like that of Example 1 had good impact-resistance.

Example 3

The procedure of Example 1 was repeated with one change; namely, the use of the diepoxide of the bis-exo-dihydrodicyclopentadienyl ether of ethylene glycol was used in place of the ether of diethylene glycol of Example 1. Here, as in the first example, the product was a hard, clear, tough, thermoset, resinous product having a Barcol hardness of 36–45.

Examples 4–20

A wide variety of polycarboxylic acids containing 3 to 6 carboxyl groups was reacted with the bis-epoxy ether employed in Example 1. The amounts of reactants in all cases was such that the number of carboxyl groups was equal to the number of epoxy groups in the bis-epoxy ether. In each case the bis-epoxy ether and the polycarboxylic acid were mixed thoroughly, put in a shallow aluminum container, and then heated first at a temperature of 100° C. for one hour and then at 150° C. for four hours. The acids and the general characteristics of the products are here tabulated:

| Acid | Product |
|---|---|
| Tricarballylic | Barcol 34–36. Very tough. |
| Glyceryl triacid phthalate | Barcol 30. Very tough. |
| Glyceryl triacid maleate | Barcol 30–35. Tough. |
| Pentaerythrityl tetraacid phthalate | Barcol 35. Tough. |
| Pentaerythrityl tetraacid maleate | Barcol 32–35. Tough. Very pale color. |
| Dipentaerythrityl hexaacid phthalate | Barcol 34–35. Excellent impact resistance. |
| Glyceryl triacid dimaleate monophthalate | Barcol 30–35. Tough. Very pale color. |
| Glyceryl triacid diphthalate monomaleate | Barcol 35–38. Tough. |
| Pentaerythricyl tetraacid diphthalate dimaleate | Barcol 40. Very tough. Very pale color. |
| Pentaerythrityl tetraacid monomaleate triphthalate | Barcol 36–40. Very tough. Very pale color. |
| Pentaerythrityl tetraacid adipate | Barcol 0. Tough, flexible gum. |
| Pentaerythrityl tetraacid succinate | Barcol 25. Tough. Dark color. |
| Sorbityl hexaacid maleate phthalate (3/1) | Barcol 37. Very tough. |
| Pentaerythrityl tetraacid trimaleate monoadipate | Barcol 30–32. Very tough. Adhesive. |
| Pentaerythrityl tetraacid glutarate | Barcol 0. Very tough. Adhesive. |
| Pentaerythrityl tetraacid trisuccinate monophthalate | Barcol 30. Brittle. Poor color. |
| Pentaerythrityl tetraacid tetrahydrophthalate | Barcol 25–29. Brittle. |

I claim:

1. A process for preparing cross-linked, resinous products which comprises reacting at a temperature of 50° C. to 250° C. (1) a diepoxide of a glycol bis-exo-dihydrodicyclopentadienyl ether which has the formula

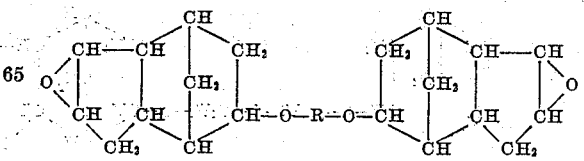

in which R is a member of the class consisting of (a) alkylene groups containing 1 to 12 carbon atoms and (b) groups of the general formula $-(R'-O)_xR'-$ in which R' is an alkylene group of 2 to 4 carbon atoms and $x$ is an integer having a value of 1 to 8 inclusive, with (2) a polycarboxylic acid containing 3 to 6 carboxyl groups from the class consisting of citric, tricarballylic, hemimellitic, trimellitic, and pyromellitic acids and the half-ester-acids of a polyhydric alcohol from the class consisting of glycerol, pentaerythritol, dipentaerythritol, mannitol, and sorbital and at least one acid from the class consisting of phthalic, maleic, succinic, glutaric, adipic, suberic, azelaic, and sebacic acids, the amount of said polycarboxylic acid being that which provides 0.7 to 2.0 carboxyl groups for each epoxy group present in said diepoxide.

2. A process for preparing cross-linked, resinous products which comprises reacting at a temperature of 100° C. to 200° C. (1) a diepoxide of a glycol bis-exo-dihydrodicyclopentadienyl ether which has the formula

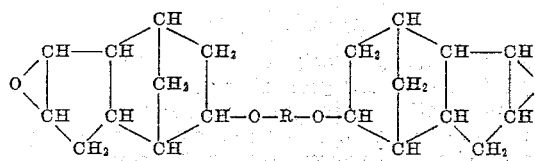

in which R is a member of the class consisting of (a) alkylene groups containing 1 to 12 carbon atoms and (b) groups of the general formula —(R′—O)$_x$R′— in which R′ is an alkylene group of 2 to 4 carbon atoms and $x$ is an integer having a value of 1 to 8 inclusive, with (2) a polycarboxylic acid containing 3 to 6 carboxyl groups from the class consisting of citric, tricarballylic, hemimellitic, trimellitic, and pyromellitic acids and the half-ester-acids of a polyhydric alcohol from the class consisting of glycerol, pentaerythritol, dipentaerythritol, mannitol, and sorbitol and at least one acid from the class consisting of phthalic, maleic, succinic, glutaric, adipic, suberic, azelaic, and sebacic acids, the amount of said polycarboxylic acid being that which provides 0.7 to 2.0 carboxyl groups for each epoxy group present in said diepoxide.

3. A process for preparing a cross-linked, resinous product which comprises chemically reacting at a temperature of 100° C. to 200° C. (1) the bis-epoxy ether which has the formula

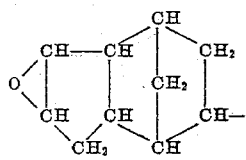

with (2) pentaerythrityl tetraacid maleate phthalate in an amount which provides 0.7 to 2.0 carboxyl groups for each epoxy group in said bis-epoxy ether.

4. A process for preparing a cross-linked, resinous product which comprises chemically reacting at a temperature of 100° C. to 200° C. (1) the bis-epoxy ether which has the formula

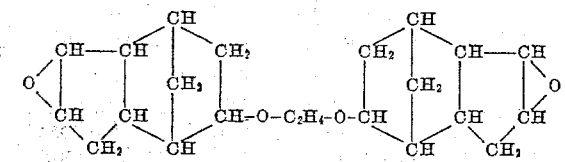

with (2) pentaerythrityl tetraacid maleate phthalate in an amount which provides 0.7 to 2.0 carboxyl groups for each epoxy group in said bis-epoxy ether.

5. A process for preparing a cross-linked, resinous product which comprises chemically reacting at a temperature of 100° C. to 200° C. (1) the bis-epoxy ether which has the formula

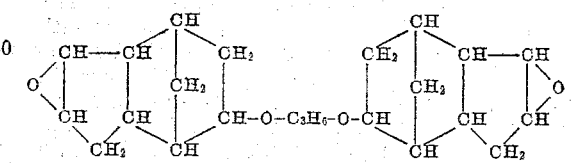

with (2) pentaerythrityl tetraacid maleate phthalate in an amount which provides 0.7 to 2.0 carboxyl groups for each epoxy group in said bis-epoxy ether.

6. A process for preparing a cross-linked, resinous product which comprises chemically reacting at a temperature of 100° C. to 200° C. (1) the bis-epoxy ether which has the formula

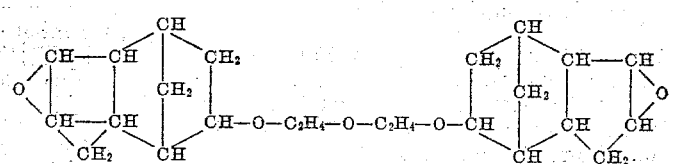

with (2) pentaerythrityl tetraacid maleate adipate in an amount which provides 0.7 to 2.0 carboxyl groups for each epoxy group in said bis-epoxy ether.

7. A process for preparing a cross-linked, resinous product which comprises chemically reacting at a temperature of 100° C. to 200° C. (1) the bis-epoxy ether which has the formula

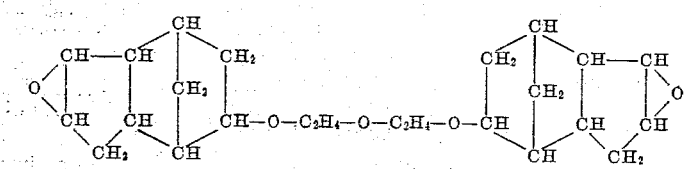

with (2) glyceryl triacid maleate phthalate in an amount which provides 0.7 to 2.0 carboxyl groups for each epoxy group in said bis-epoxy ether.

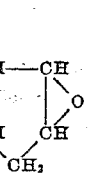

8. A resinous composition of matter as prepared by claim 1.

9. A resinous composition of matter as prepared by claim 3.

10. A resinous composition of matter as prepared by claim 4.

11. A resinous composition of matter as prepared by claim 5.

12. A resinous composition of matter as prepared by claim 6.

13. A resinous composition of matter as prepared by claim 7.

14. A molding composition containing (1) a diepoxide of a glycol bis-exo-dihydrodicyclopentadienyl ether which has the formula

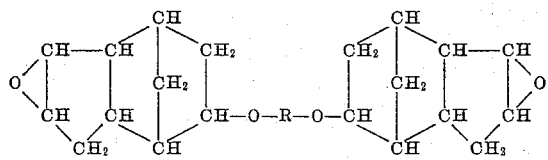

in which R is a member of the class consisting of (a) alkylene groups containing 1 to 12 carbon atoms and (b) groups of the general formula —(R'—O)$_x$R'— in which R' is an alkylene group of 2 to 4 carbon atoms and $x$ is an integer having a value of 1 to 8 inclusive, and (2) a polycarboxylic acid containing 3 to 5 carboxyl groups from the class consisting of citric, tricarballylic, hemimellitic, trimellitic, and pyromellitic acids and the half-ester-acids of a polyhydric alcohol from the class consisting of glycerol, pentaerythritol, dipentaerythritol, mannitol, and sorbitol and at least one acid from the class consisting of phthalic, maleic, succinic, glutaric, adipic, suberic, azaleic, and sebacic acids, the amount of said polycarboxylic acid being that which provides 0.7 to 2.0 carboxyl groups for each epoxy group present in said diepoxide.

15. A molding composition containing (1) the bisepoxy ether which has the formula

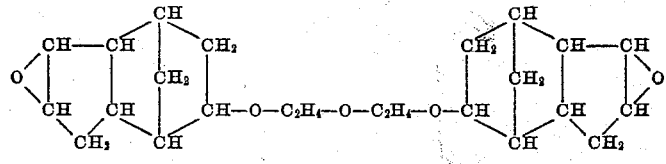

and (2) pentaerythrityl tetraacid maleate phthalate in an amount which provides 0.7 to 2.0 carboxyl groups for each epoxy group in said bis-epoxy ether.

16. A molding composition containing (1) the bis-epoxy ether which has the formula

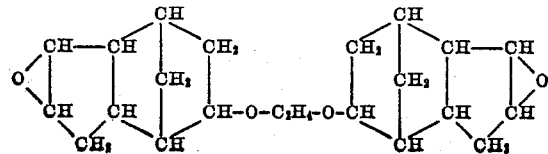

and (2) pentaerythrityl tetraacid maleate phthalate in an amount which provides 0.7 to 2.0 carboxyl groups for each epoxy group in said bis-epoxy ether.

17. A molding composition containing (1) the bis-epoxy ether which has the formula

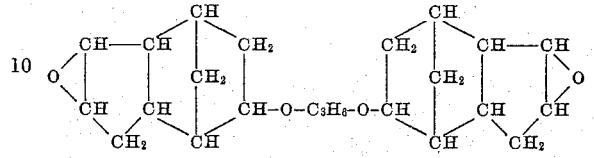

and (2) pentaerythrityl tetraacid maleate phthalate in an amount which provides 0.7 to 2.0 carboxyl groups for each epoxy group in said bis-epoxy ether.

18. A molding composition containing (1) the bis-epoxy ether which has the formula

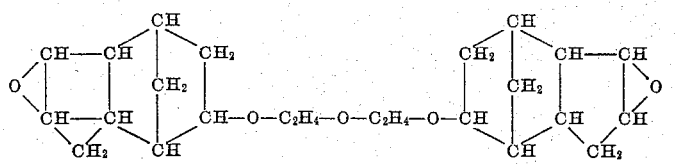

and (2) pentaerythrityl tetraacid maleate adipate in an amount which provides 0.7 to 2.0 carboxyl groups for each epoxy group in said bis-epoxy ether.

19. A molding composition containing (1) the bis-epoxy ether which has the formula

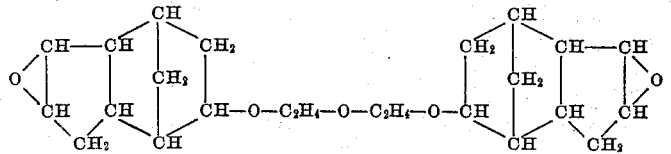

and (2) glyceryl triacid maleate phthalate in an amount which provides 0.7 to 2.0 carboxyl groups for each epoxy group in said bis-epoxy ether.

JOSEPH E. KOROLY.

REFERENCES CITED

The following references are of record in the file of this patent:

UNITED STATES PATENTS

| Number | Name | Date |
|---|---|---|
| 2,527,806 | Foster | Oct. 31, 1950 |
| 2,541,670 | Segall et al. | Feb. 13, 1951 |
| 2,543,419 | Niederhauser | Feb. 27, 1951 |